US008355666B2

(12) United States Patent
Rajkotia et al.

(10) Patent No.: US 8,355,666 B2
(45) Date of Patent: Jan. 15, 2013

(54) APPARATUS AND METHOD FOR INTERFERENCE-ADAPTIVE COMMUNICATIONS

(75) Inventors: Amol Rajkotia, San Diego, CA (US);
Yuheng Huang, San Diego, CA (US);
Ozgur Dural, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1042 days.

(21) Appl. No.: 12/208,280

(22) Filed: Sep. 10, 2008

(65) Prior Publication Data
US 2010/0062705 A1  Mar. 11, 2010

(51) Int. Cl.
*H04W 4/00* (2009.01)
*H04B 7/216* (2006.01)
*H04B 1/38* (2006.01)
*H04B 1/00* (2006.01)
*H04K 3/00* (2006.01)

(52) U.S. Cl. ............. 455/1; 455/561; 375/141; 375/146; 375/147; 370/314; 370/342; 370/441; 370/442

(58) Field of Classification Search .............. 455/1, 561; 375/141, 146, 147; 370/314, 342, 441, 442
See application file for complete search history.

(56) References Cited

U.S. PATENT DOCUMENTS

| | | | | |
|---|---|---|---|---|
| 6,415,005 | B2 * | 7/2002 | Koga et al. | 375/347 |
| 7,620,112 | B2 * | 11/2009 | Tang et al. | 375/260 |
| 8,059,693 | B2 * | 11/2011 | Nieto et al. | 375/130 |
| 2001/0001617 | A1 * | 5/2001 | Koga et al. | 375/347 |
| 2003/0067866 | A1 * | 4/2003 | Jung | 370/210 |
| 2003/0235254 | A1 | 12/2003 | Fanson et al. | |
| 2005/0036563 | A1 | 2/2005 | Suzuki et al. | |
| 2006/0188033 | A1 * | 8/2006 | Zehavi et al. | 375/260 |
| 2007/0041457 | A1 * | 2/2007 | Kadous et al. | 375/260 |

(Continued)

FOREIGN PATENT DOCUMENTS
EP  2026486  2/2009

(Continued)

OTHER PUBLICATIONS

European Computer Manufacturers Association, "High Rate Ultra Wideband PHY (physical layer) and MAC (Media Access Control)", vol. 2nd edition, No. ECMA-368, Dec. 1, 2007, pp. 59-74, XP002603151.

(Continued)

*Primary Examiner* — Bobbak Safaipour
(74) *Attorney, Agent, or Firm* — Qualcomm Patent Group; Alan Gordon; James Hunt Yancey, Jr.

(57) ABSTRACT

In embodiments, an adaptive tone erasure technique is applied to orthogonal frequency division multiplexing (OFDM) communications, such as ECMA-368 standard ultra-wideband (UWB) communications. A transmitter obtains jammed sub-carrier information and calculates an erasure mask. The jammed sub-carriers are nulled before transmitting to a receiver. In accordance with the erasure mask, bits falling on the jammed sub-carriers are replaced by erasure bits before interleaving, keeping the interleaver block size constant notwithstanding variations in the number of the jammed sub-carriers. The receiver also obtains the jammed sub-carrier information and the erasure mask. After the receiver deinterleaves the constant size blocks, it decodes the data without the erasure bits. The transmitter may detect the jammed sub-carriers itself, or obtain the information from the receiver. The receiver similarly may detect the jammed sub-carriers itself, or obtain the information from the transmitter.

53 Claims, 8 Drawing Sheets

U.S. PATENT DOCUMENTS

| | | | |
|---|---|---|---|
| 2007/0058693 A1 | 3/2007 | Aytur et al. | |
| 2007/0082648 A1* | 4/2007 | Gallagher | 455/343.2 |
| 2007/0121741 A1* | 5/2007 | Tang et al. | 375/260 |
| 2008/0043859 A1* | 2/2008 | Moffatt | 375/260 |
| 2008/0043860 A1* | 2/2008 | Moffatt | 375/260 |
| 2009/0052594 A1* | 2/2009 | Li et al. | 375/341 |
| 2009/0110033 A1* | 4/2009 | Shattil | 375/141 |
| 2009/0153354 A1* | 6/2009 | Daussin et al. | 340/853.1 |
| 2009/0164868 A1* | 6/2009 | Anand et al. | 714/758 |
| 2010/0014559 A1* | 1/2010 | Nieto et al. | 375/130 |
| 2010/0098185 A1* | 4/2010 | Miyazaki | 375/267 |
| 2011/0093762 A1* | 4/2011 | Kwon et al. | 714/758 |
| 2011/0176405 A1* | 7/2011 | Nimbalker et al. | 370/206 |

FOREIGN PATENT DOCUMENTS

WO    WO 2007148579    12/2007

OTHER PUBLICATIONS

"International Search Report and Written Opinion—PCT/US2009/054696—ISA-EPO—Nov. 3, 2010".

Office Action from Korean Intellectual Property Office, dated May 9, 2012 for Korean Application No. 10-2011-7008308, (providing original Korean action and translation provided by foreign counsel).

* cited by examiner

APPARATUS AND METHOD FOR INTERFERENCE-ADAPTIVE COMMUNICATIONS

BACKGROUND

1. Field

The present invention relates generally to communications. More particularly, in aspects the invention relates to adaptation of wireless communication parameters based on interference.

2. Background

A modern communication system is expected to provide reliable data transmission for a variety of applications, such as voice and data applications. In a point-to-multipoint communications context, known communication systems are based on frequency division multiple access (FDMA), time division multiple access (TDMA), code division multiple access (CDMA), time division duplexing (TDD), and perhaps other multiple access communication schemes.

A CDMA system may be designed to support one or more CDMA standards, such as (1) the "TIA/EIA-95 Mobile Station-Base Station Compatibility Standard for Dual-Mode Wideband Spread Spectrum Cellular System" (this standard with its enhanced revisions A and B may be referred to as the "IS-95 standard"), (2) the "TIA/EIA-98-C Recommended Minimum Standard for Dual-Mode Wideband Spread Spectrum Cellular Mobile Station" (the "IS-98 standard"), (3) the standard sponsored by a consortium named "3rd Generation Partnership Project" (3GPP) and embodied in a set of documents known as the "W-CDMA standard," (4) the standard sponsored by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "TIA/EIA/IS-856 cdma2000 High Rate Packet Data Air Interface Specification" (the "cdma2000 standard" collectively), (5) the 1xEV-DO standard, and (6) certain other standards.

Portability and functionality of wireless communication devices continue to improve, contributing to the proliferation of wireless communication networks. Many conventionally-wired connections are being replaced with wireless connections, including ad hoc connections made when one wireless device moves into the connectivity area of another wireless device. Of some interest are wireless local area networks (wireless LANs or WLANs), such as wireless networks under the various IEEE 802.11 standards. Of some interest are also wireless personal area networks (wireless PANs or WPANs), which networks are often used for communication between or among devices close to one person. Wireless PAN technologies typically have a reach of about ten meters, and may include Bluetooth® devices, ZigBee® (IEEE 802.15.4 standard) devices, ultra-wide band (wireless USB or UWB) devices, and various remote controls. WPAN rates of data transfer currently range up to 480 Mbps for UWB technology specified in ECMA-368, with further enhancements possible to achieve rates of 1 Gbps and higher.

Common wireless LAN technology is often referred to as "WiFi," and operates under the IEEE standard 802.11a/b/g. Such WLAN networks typically operate over a range of approximately fifty meters, and provide data rates of 54 Mbps for IEEE 802.11a and 802.11g. The emerging IEEE 802.11n standard may improve the data rates to 600 Mbps.

A wireless LAN or PAN network may be used for communications between or among personal devices, or for communications between such personal devices and access points providing other resources, such as gateways to additional networks, including cellular networks and the Internet.

Wireless body area networks (WBANs) may be considered a subset of personal area networks. A wireless body area network may include wireless sensors for monitoring various body parameters and functions. The sensors may transmit real-time data to a base station located, for example, in a person's home. Typical range of WBANs is about three meters.

A wireless network can be constructed using solely peer-to-peer communications, without access points. Further, wireless networks can include both access points (infrastructure mode) and peer-to-peer communications. (These types of networks may be referred to as ad hoc networks). Ad hoc networks can be self-configuring with independent discovery of devices by other devices. For example, when a mobile device (or access point) receives communication from another mobile device, the other mobile device may be added to the network. As the mobile devices leave the area, they may be dynamically removed from the network. Thus, the topography of the network can be constantly changing. In a "multihop" topology, a transmission may be transferred through a number of hops or segments, rather than directly from a sender to a recipient. Multihop topology need not exclude direct device-to-device communications.

WiMedia Ultra-Wideband (UWB) as promulgated by ECMA International in Standard ECMA-368, "High Rate Ultra Wideband PHY and MAC Standard" (December 2005) describes a common radio platform distributed medium-access technique that provides a solution to operating different wireless applications within the same network. The WiMedia UWB common radio platform incorporates media access control (MAC) layer and physical (PHY) layer specifications based on multi-band orthogonal frequency-division multiplexing (MB-OFDM). The WiMedia MAC and PHY specifications are intentionally designed to adapt to various requirements set by international regulatory bodies. Manufacturers needing to meet regulations in various countries can thus do so relatively easily and cost-effectively. Some other application-friendly features that WiMedia UWB attempts to implement include reduced level of complexity per node, long battery life, support of multiple power management modes and higher spatial capacity.

WiMedia UWB-compliant receivers may need to cope with interference from existing wireless services while providing large operational bandwidth. At the same time, such receivers typically perform with relatively low transmit power.

UWB systems may be designed to operate in an unlicensed part of spectrum using transmit equivalent or effective isotropic radiated power (EIRP) of −41.3 dBm/MHz, and a bandwidth of 500 MHz or more. Such a large spectral occupancy increases the likelihood of some interference falling into the UWB receiver bandwidth. At the same time, the low transmit EIRP limits the communication range and provides little link margin to deal with the interference. To enable the UWB receiver to continue to provide the desired user experience (latency and/or throughput) in the presence of in-band interference, having some form of interference mitigation is desirable.

An interferer may be any other device that runs different applications (e.g., WiMax and future wireless systems) and transmits signals in the same electromagnetic frequency band as the UWB receiver. Interference can also be self-generated within the platform where the UWB receiver resides. In multi-mode handsets or laptops, for example, harmonics, spurious emissions, clocks, and similar signals generated by other radios could fall within the UWB band.

A need exists for apparatus, methods, and articles of manufacture that improve reliability of wireless communications in the presence of interference, particularly within wideband wireless networks. A need also exists in the art for apparatus, methods, and articles of manufacture that reduce transmissions created by wireless device that constitute interference for other wireless devices, particularly in wideband networks including wireless LANS and wireless PANs. A need further exists for apparatus, methods, and articles of manufacture that reduce power consumption of wireless devices.

SUMMARY

Embodiments disclosed herein may address one or more of the above stated needs by providing apparatus, methods, and articles of manufacture for inserting erasure bits into sub-blocks of data, with the erasure bits falling onto jammed sub-carriers. In this way, an interleaver size may be kept constant.

In an embodiment, a communication method includes obtaining at a transmitter device current jammed sub-carrier information identifying currently jammed sub-carriers of a plurality of sub-carriers available for carrying data from the transmitter device to a receiver device. The method also includes obtaining at the transmitter device an erasure mask corresponding to the current jammed sub-carrier information. The method additionally includes inserting erasure bits into each data sub-block processed in accordance with the erasure mask to obtain sub-blocks of a predetermined size. The method further includes interleaving each sub-block of the sub-blocks of the predetermined size to obtain interleaved sub-blocks. The method further includes transmitting wirelessly the interleaved sub-blocks from the transmitter device. In accordance with the method, the step of obtaining the erasure mask is performed so that the erasure bits fall onto the currently jammed sub-carriers.

In an embodiment, a transmitter device includes a memory, a wireless receiver, a wireless transmitter, and a controller. The controller is coupled to the wireless receiver, the wireless transmitter, and the memory. The controller is configured to perform a number of steps. The steps include obtaining at the transmitter device current jammed sub-carrier information identifying currently jammed sub-carriers of a plurality of sub-carriers available for carrying data from the transmitter device to a receiver device. The steps also include obtaining at the transmitter device an erasure mask corresponding to the current jammed sub-carrier information. The steps additionally include inserting erasure bits into each data sub-block processed in accordance with the erasure mask to obtain sub-blocks of a predetermined size. The steps further include interleaving each sub-block of the sub-blocks of the predetermined size to obtain interleaved sub-blocks. The steps further include transmitting wirelessly the interleaved sub-blocks from the transmitter device. The step of obtaining the erasure mask is performed so that the erasure bits fall onto the currently jammed sub-carriers.

In an embodiment, a transmitter device includes a means for storing data, a means for wirelessly receiving, a means for wirelessly transmitting, and a means for processing. The means for processing is coupled to the means for receiving, the means for transmitting, and the means for storing. The means for processing is configured to perform a number of steps. The steps include obtaining at the transmitter device current jammed sub-carrier information identifying currently jammed sub-carriers of a plurality of sub-carriers available for carrying data from the transmitter device to a receiver device. The steps also include obtaining at the transmitter device an erasure mask corresponding to the current jammed sub-carrier information. The steps additionally include inserting erasure bits into each sub-block processed in accordance with the erasure mask to obtain sub-blocks of a predetermined size. The steps further include interleaving each sub-block of the sub-blocks of the predetermined size to obtain interleaved sub-blocks. The steps further include transmitting wirelessly the interleaved sub-blocks from the transmitter device. The step of obtaining the erasure mask is performed so that the erasure bits fall onto the currently jammed sub-carriers.

In an embodiment, a machine-readable medium stores instructions. When the instructions are executed by at least one controller of a transmitter device, the instructions cause the transmitter device to perform a number of steps. The steps include obtaining at the transmitter device current jammed sub-carrier information identifying currently jammed sub-carriers of a plurality of sub-carriers available for carrying data from the transmitter device to a receiver device. The steps also include obtaining at the transmitter device an erasure mask corresponding to the current jammed sub-carrier information. The steps additionally include inserting erasure bits into each data sub-block processed in accordance with the erasure mask to obtain sub-blocks of a predetermined size. The steps further include interleaving each sub-block of the sub-blocks of the predetermined size to obtain interleaved sub-blocks. The steps further include transmitting wirelessly the interleaved sub-blocks from the transmitter device. The step of obtaining the erasure mask is performed so that the erasure bits fall onto the currently jammed sub-carriers.

In an embodiment, a communication method includes obtaining at a receiver device current jammed sub-carrier information identifying currently jammed sub-carriers of a plurality of sub-carriers available for carrying data from a transmitter device to the receiver device. The method also includes obtaining at the receiver device an erasure mask corresponding to the current jammed sub-carrier information. The method additionally includes receiving at the receiver device interleaved sub-blocks from the transmitter device, the interleaved sub-blocks having a predetermined size, the interleaved sub-blocks comprising erasure bits inserted in accordance with the erasure mask. The steps further include deinterleaving each interleaved sub-block of the interleaved sub-blocks to obtain deinterleaved sub-blocks. The method further includes removing the erasure bits from the deinterleaved sub-blocks in accordance with the erasure mask to obtain processed sub-blocks. The method further includes decoding the processed sub-blocks. The step of obtaining the erasure mask is performed so that the erasure bits fall onto the currently jammed sub-carriers.

In an embodiment, a receiver device includes a memory, a wireless receiver, a wireless transmitter, and a controller. The controller is coupled to the wireless receiver, the wireless transmitter, and the memory. The controller is configured to perform a number of steps. The steps include obtaining current jammed sub-carrier information identifying currently jammed sub-carriers of a plurality of sub-carriers available for carrying data from a transmitter device to the receiver device. The steps also include obtaining an erasure mask corresponding to the current jammed sub-carrier information.

The steps additionally include receiving interleaved sub-blocks from the transmitter device, the interleaved sub-blocks having a predetermined size, the interleaved sub-blocks comprising erasure bits inserted in accordance with the erasure mask. The steps further include deinterleaving each interleaved sub-block of the interleaved sub-blocks to obtain deinterleaved sub-blocks. The steps further include removing the erasure bits from the deinterleaved sub-blocks in accordance with the erasure mask to obtain processed sub-blocks. The steps further include decoding the processed sub-blocks.

The step of obtaining the erasure mask is performed so that the erasure bits fall onto the currently jammed sub-carriers.

In an embodiment, a receiver device includes a means for storing data, a means for wirelessly receiving, a means for wirelessly transmitting, and a means for processing. The means for processing is coupled to the means for receiving, the means for transmitting, and the means for storing. The means for processing is configured to perform a number of steps. The steps include obtaining current jammed sub-carrier information identifying currently jammed sub-carriers of a plurality of sub-carriers available for carrying data from a transmitter device to the receiver device. The steps also include obtaining an erasure mask corresponding to the current jammed sub-carrier information. The steps additionally include receiving interleaved sub-blocks from the transmitter device, the interleaved sub-blocks having a predetermined size, the interleaved sub-blocks comprising erasure bits inserted in accordance with the erasure mask. The steps further include deinterleaving each interleaved sub-block of the interleaved sub-blocks to obtain deinterleaved sub-blocks. The steps further include removing the erasure bits from the deinterleaved sub-blocks in accordance with the erasure mask to obtain processed sub-blocks. The steps further include decoding the processed sub-blocks. The step of obtaining the erasure mask is performed so that the erasure bits fall onto the currently jammed sub-carriers.

In an embodiment, a machine-readable medium stores instructions. When the instructions are executed by at least one controller of a wireless receiver device, the instructions cause the wireless receiver device to perform a number of steps. The steps include obtaining at the wireless receiver device current jammed sub-carrier information identifying currently jammed sub-carriers of a plurality of sub-carriers available for carrying data from a wireless transmitter device to the wireless receiver device. The steps also include obtaining at the wireless receiver device an erasure mask corresponding to the current jammed sub-carrier information. The steps additionally include receiving at the wireless receiver device interleaved sub-blocks from the wireless transmitter device, the interleaved sub-blocks having a predetermined size, the interleaved sub-blocks comprising erasure bits inserted in accordance with the erasure mask. The steps further include deinterleaving each interleaved sub-block of the interleaved sub-blocks to obtain deinterleaved sub-blocks. The steps further include removing the erasure bits from the deinterleaved sub-blocks in accordance with the erasure mask to obtain processed sub-blocks. The steps further include decoding the processed sub-blocks. The step of obtaining the erasure mask is performed so that the erasure bits fall onto the currently jammed sub-carriers.

These and other aspects of the present invention will be better understood with reference to the following description, drawings, and appended claims.

DETAILED DESCRIPTION

In this document, the words "embodiment," "variant," and similar expressions are used to refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place may refer to a different apparatus, process, or article of manufacture. The expressions "alternative embodiment," "alternatively," and similar phrases may be used to indicate one of a number of different possible embodiments. The number of possible embodiments is not necessarily limited to two or any other quantity.

The word "exemplary" may be used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the invention.

A "jammed sub-carrier" or "interfered with sub-carrier" and similar expression signify a sub-carrier with signal to noise and/or interference ratio at or below a predetermined level.

"Tone" and "sub-carrier" are generally used interchangeably.

"Nulling" a tone or sub-carrier at a transmitter may include removing the sub-carrier from the transmitted signal.

Figure 1:
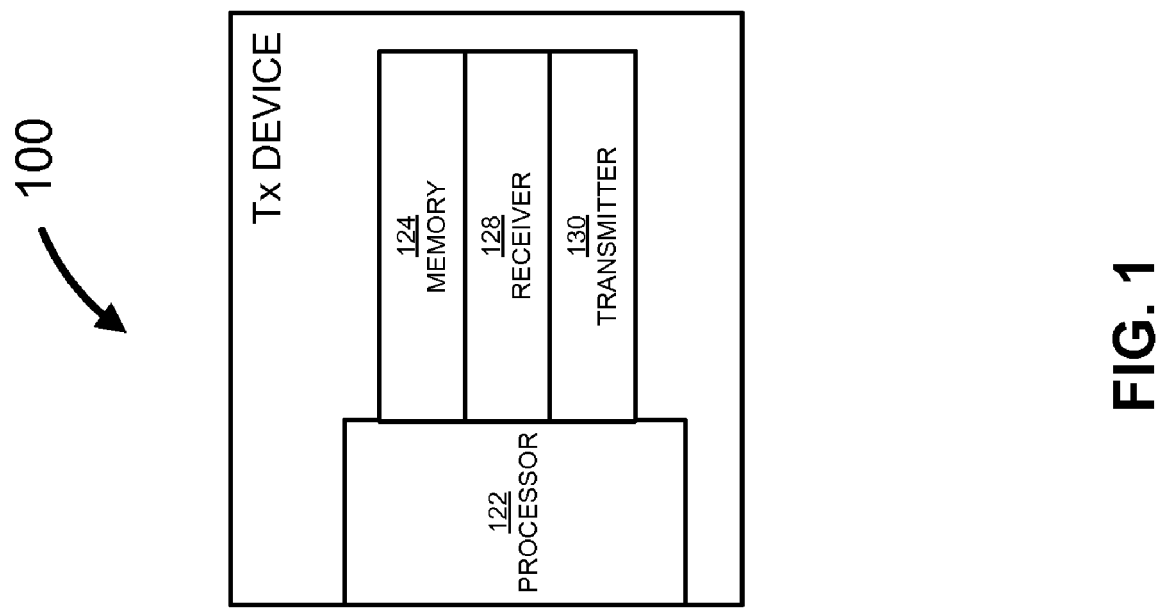
FIG. 1 illustrates selected components of a wireless transmitter device within a wireless network.
Figure 2:
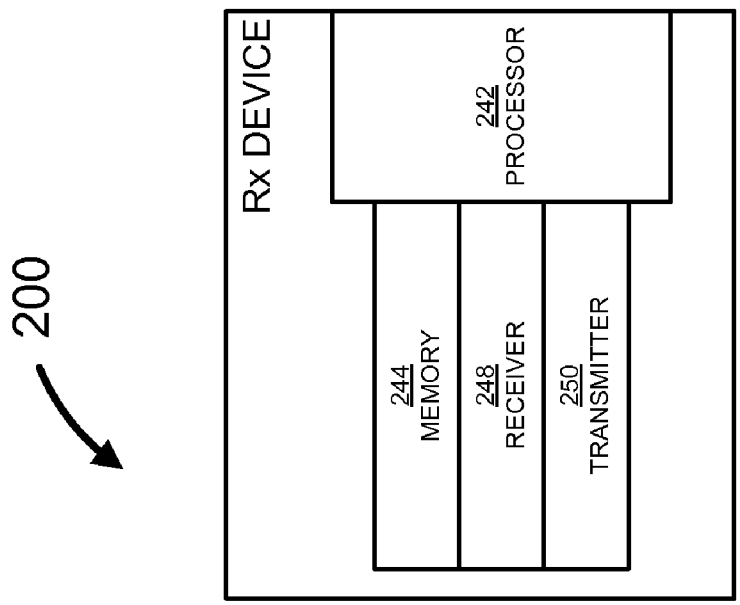
FIG. 2 illustrates selected components of a wireless receiver device within a wireless network.

FIGS. 1 and 2 illustrate, respectively, selected components of a first wireless device 100 and a second wireless device 200. The two devices are in communication with each other within a wireless network. The first wireless device 100 includes a processor 122, a memory 124, a receiver 128 configured to receive communications from wireless devices of a wireless network (including the second wireless device 200), and a transmitter 130 configured to send communications to the devices of the wireless network (including the second wireless device 200). The memory 124, the receiver 128, and the transmitter 130 are coupled to the processor 122, which can configure, read from, and/or write to these devices.

The second wireless device 200 similarly includes a processor 242, a memory 244, a receiver 248 configured to receive communications from devices of the wireless network (including the first wireless device 100), and a transmitter 250 configured to send communications to the devices of the wireless network (including the first wireless device 100). The memory 244, the receiver 248, and the transmitter 250 are coupled to the processor 242, which can configure, read from, and/or write to these devices.

Each of the processors 122 and 242 may include, for example, one or more controllers, one or more microprocessors, one or more digital signal processors, one or more state machines, or a combination of such devices. Each of the memories 124 and 244 may be internal or external to the corresponding processor (122 or 242), and may include random access memory (RAM), read-only memory (ROM), programmable ROM (PROM), erasable PROM (EPROM), electrically erasable EPROM (EEPROM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), magnetic storage, other memory devices, and/or multiple memory modules selected from the preceding list.

In some embodiments, the communications within the wireless network may span up to three meters, up to ten meters, up to thirty meters, up to one hundred meters, up to three hundred meters or longer distances. In one embodiment of the wireless network, the communications are conducted in conformity with the ECMA-368/369 standards. Accordingly, the receivers 128/248 and the transmitters 130/250 are configured to operate under the ECMA standards. In other embodiments, the communications may be conducted under other communication schemes, including the WiMedia standard, the Bluetooth® standard, another UWB standard, the ZigBee® standard, or one of the IEEE 802.11 standards. This list is not necessarily exclusive.

Either the first wireless device 100, the second wireless device 200, or both may have additional elements, including receivers and/or transmitters designed to communicate with other wireless networks, including cellular networks, or with wired networks. The cellular networks may operate, for example, under UTRAN or UMTS Terrestrial Radio Access Network standards, including code division multiple access (CDMA) and Global System for Mobile Communication (GSM) network standards.

One of the wireless devices (for example, the first wireless device 100) may serve as a gateway into a cellular network for other wireless devices (for example, the second wireless device 200).

The ECMA-368/369 communications between the first and second wireless devices 100 and 200 may use an orthogonal frequency division multiplexing (OFDM) technique for transmitting and receiving information. In accordance with OFDM, a number of closely-spaced orthogonal sub-carriers (or tones) carry data. The data may be divided into several parallel data streams with one data stream per sub-carrier. Each sub-carrier may be modulated with a conventional modulation scheme, for example, quadrature amplitude modulation (QAM) or quadrature phase shift keying (QPSK).

The OFDM communications in the wireless network may be, for example, multi-band with one hundred data carriers and ten guard carriers. Other devices may use these and other communication techniques in the same band (or bands) as the communications between the first and second wireless devices 100 and 200. The other devices may communicate among themselves, or with one or both of the first and second wireless devices 100 and 200. To the first and second wireless devices 100 and 200, the communications involving other devices appear as interference. Of course, interference may also originate elsewhere, for example, from other radios in the first and second wireless devices 100 and 200.

Various techniques that the first and second wireless devices 100 and 200 can use to mitigate the interference to which the ECMA-368/369 OFDM communications between these devices may be subjected is described. For purposes of the following discussion, it is assumed that the first wireless device 100 is a transmitter device, and the second wireless device 200 is a receiver device. The roles of course can be reversed. Moreover, the roles may be combined so that each of these devices is a transmitter device for some communications with the other device, and a receiver device for other communications with the other device.

The receiver device 200 can determine the extent of interference or jamming affecting each of the OFDM sub-carriers transmitted from the transmitter device 100.

For example, the receiver device 200 can estimate signal to interference and/or noise ratio for the data received on each sub-carrier over some predetermined and possibly dynamically adjusted period of time. The receiver device 200 can communicate the knowledge about which sub-carriers are jammed (and possibly the extent of jamming) to the transmitter device 100. The transmitter device 100 can then configure itself to null out the jammed sub-carriers, and the receiver device 200 can configure itself to perform information decoding accordingly.

This is similar to puncturing of a convolutional code, where coded bits are modulated into complex-valued symbols and loaded onto data sub-carriers, and then symbols on jammed sub-carriers are punctured (that is, replaced with zero). The coded bits on the punctured sub-carriers are thus lost, degrading performance of the transmission link from the transmitter device 100 to the receiver device 200.

One approach for mitigation of the performance degradation due to the effective puncturing is not to use the jammed sub-carriers. In other words, no coded bits are loaded on those sub-carriers, avoiding performance loss due to the "puncturing" operation. This approach, however, deleteriously affects the operation of an interleaver of the transmitter device 100 and a deinterleaver of the receiver device 200. This is because in ECMA-368/369 UWB, the interleaver size $N_{CBP6S}$ is based on the number of coded bits per six OFDM symbols. When a number $N_{in}$ of interfered with (jammed) sub-carriers is not used, the effective number of coded bit per six OFDM symbols decreases to a new size $N'_{CBP6S}$. This problem interferes with the operations of the interleaver and the deinterleaver. A number of solutions to this problem are discussed below.

Interleaver and deinterleaver may be reconfigured so that their size is changed to match $N'_{CBP6S}$. Note, however, that $N_{in}$ depends on the interferer's bandwidth and power, and can vary widely for different interferers, or even for a single interferer. Thus, $N'_{CBP6S}$ can also change from time to time and assume a range of numbers. It may be difficult to configure dynamically the interleaver of the transmitter device 100 and the deinterleaver of the receiver device 200. Moreover, there may not exist a good square/rectangular interleaver for some values of $N'_{CBP6S}$.

The interleaver size may also be kept constant, and $N'_{CBP6S}$ bits may be loaded onto the current six OFDM symbols (without using the jammed sub-carriers). The remaining $(N_{CBP6S}-N'_{CBP6S})$ coded bits may then be loaded onto the subsequent OFDM symbols. When the current six OFDM symbols are demodulated at the receiver device 200, only $N'_{CBP6S}$ soft coded bits are then available. In order to get the remaining $(N_{CBP6S}-N'_{CBP6S})$ soft coded bits, the receiver device 200 needs to wait until the next six OFDM symbols are demodulated. Therefore, if the interleaver size is held constant, additional delays may be introduced at the receiver device 200.

Figure 3:
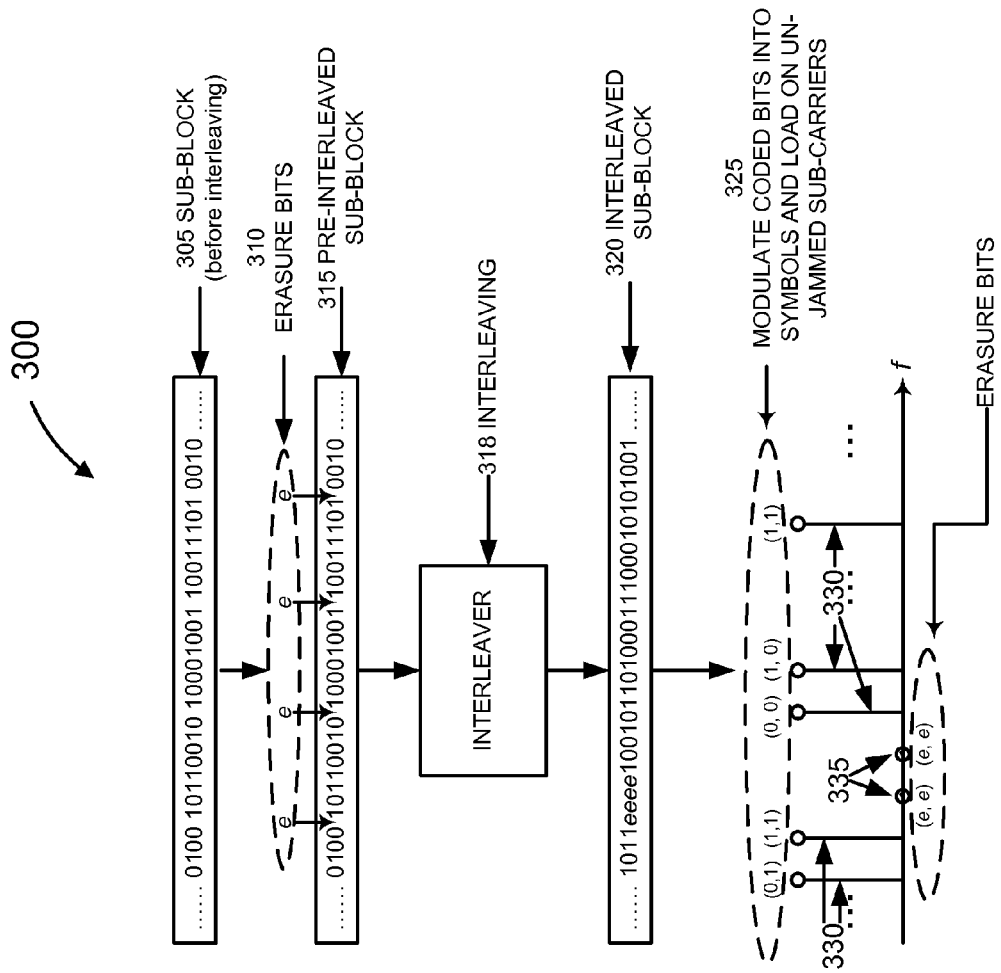
FIG. 3 illustrates selected elements of a process of an adaptive transmitter tone erasure technique.

FIG. 3 illustrates a process 300 of an "adaptive transmitter tone erasure" technique for addressing problems discussed in the preceding paragraphs. In accordance with this technique, at the transmitter device 100 every $N'_{CBP6S}$ coded bits are grouped into a sub-block (e.g., sub-block 305). A number of ($N_{CBP6S}$-$N'_{CBP6S}$) "erasure bits" 310 (which do not contain useful information) are inserted into each such sub-block to maintain a constant block size, resulting in a pre-interleaver sub-block 315.

An interleaving step 318 (for example, three-step interleaving) is then performed on the pre-interleaved sub-block 315 by an interleaver of the transmitter device 100, resulting in an interleaved sub-block 320. Then the coded bits of the interleaved sub-block 320 are modulated 325 into symbols and loaded on available (not jammed) sub-carriers 330 of the OFDM transmission scheme. In one embodiment, the symbols may be quadrature phase shift keying (QPSK) symbols. The locations where erasure bits are inserted are pre-calculated so that after the interleaving step (318), the erasure bits will fall exactly onto the interfered (jammed) sub-carriers 335. Any sub-carriers loaded with an erasure value will be "erased," e.g., their bits may be set zero. Although two adjacent jammed sub-carriers 335 are shown in FIG. 3, there may be one or multiple groups of jammed sub-carriers 335, with one or more sub-carriers 335 in each such jammed sub-carrier group.

In one embodiment, the jammed sub-carriers need not be transmitted. Thus, the interference from the transmitter device 100 that affects other devices operating in the same band may beneficially be reduced.

Figure 4:
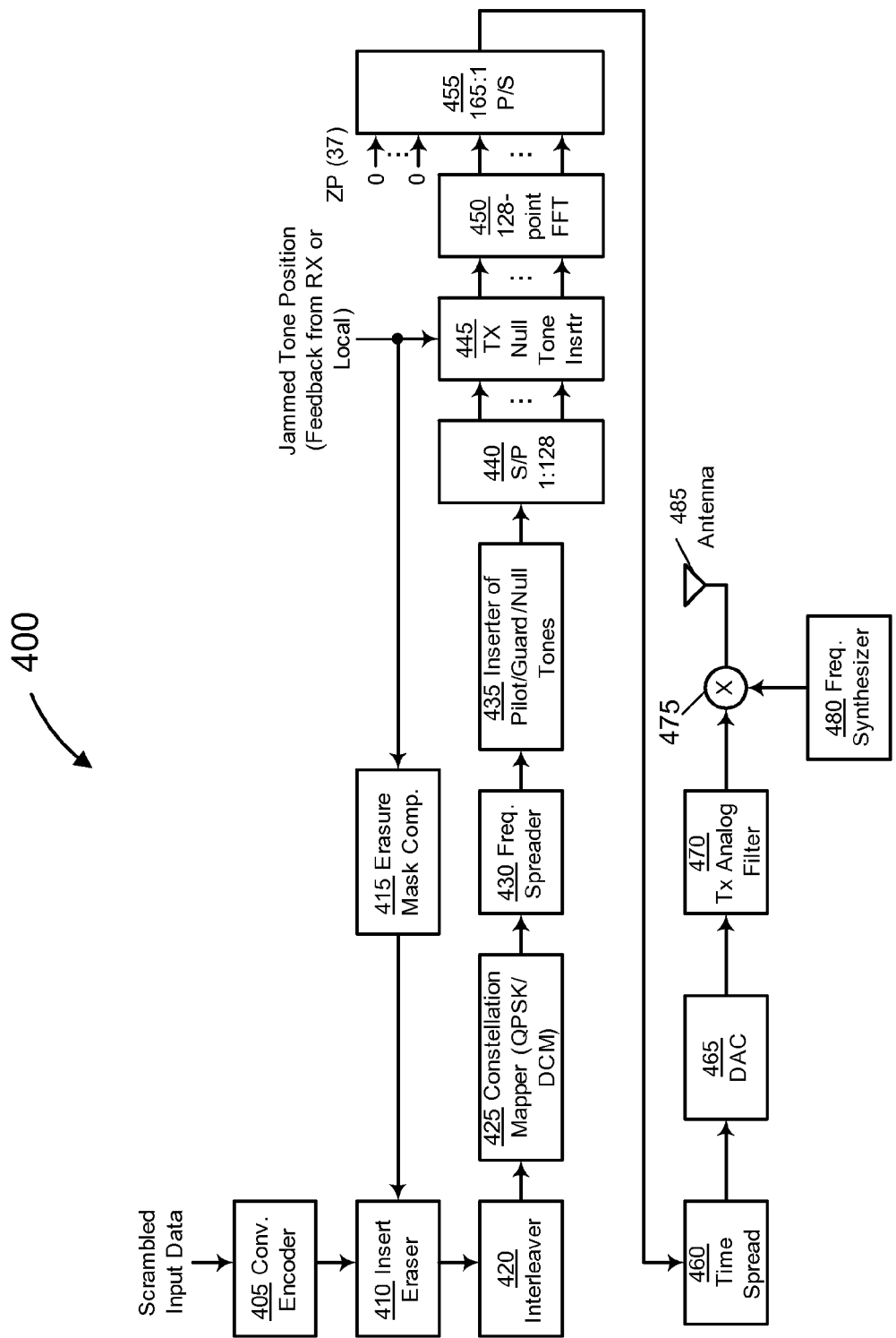
FIG. 4 illustrates in a block diagram form selected components of a transmitter configured to implement the adaptive erasure technique.

FIG. 4 illustrates in a block diagram form selected components of an ECMA-368/369 UWB transmitter 400 configured to implement the adaptive erasure technique discussed above in relation to FIG. 3. The transmitter 400 may be the same as the transmitter 130 of the transmitting device 100.

The transmitter 400 includes an encoder 405 configured to receive scrambled data and convolutionally encode the data.

The transmitter 400 also includes an insert erasure bit block 410 and erasure mask computation block 415. These blocks are configured to receive at the insert erasure bit block 410 the convolutionally encoded data and insert data erasure bits under control of the erasure bit computation block 415, so that the insert erasure bit block 410 outputs constant fixed size sub-blocks with erasure bits falling on the jammed sub-carriers in later processing, as is discussed above in relation to FIG. 3. Note that the erasure bit computation block 415 is configured to compute the erasure bit positions based on the jammed sub-carrier position information; the information may be received from the receiver device 200, or determined locally at the transmitter device 100, as is discussed in more detail below.

An interleaver 420 of the transmitter 400 interleaves the sub-blocks with the inserted erasure bits, generating interleaved sub-blocks of constant size.

The transmitter 400 further includes a constellation mapper 425 configured to map the bits of the interleaved sub-blocks into modulated symbols, for example, QPSK or QPSK/DCM (dual carrier modulation) symbols. The modulated symbols are then frequency spread by a frequency spreader block 430.

An inserter block 435 of the transmitter 400 is configured to insert pilot signal(s), guard tone(s), and null tone(s) into the frequency-spread signal generated by the frequency spreader block 430. The resulting signal is processed in a serial-to-parallel converter 440, and then passed through a transmit null tone inserter block 445. The transmit null tone inserter block 445 is configured to null the tones corresponding to the jammed sub-carriers, as is discussed above in relation to FIG. 3. The transmit null tone inserter block 445 determines the particular tones to be nulled based on the jammed sub-carrier position information received from the receiver device 200 or determined locally.

After the transmit null tone inserter block 445, the parallel signal is processed in a fast fourier transform (FFT) block 450, parallel-to-serial converter 455, and time spreader 460. From the time spreader 460 the digital signal is converted into analog form by a digital-to-analog converter (DAC) 465, and filtered in a transmit filter 470. The filtered signal is upconverted to a transmit frequency in a mixer 475 using a frequency synthesizer 480 as a local oscillator, and transmitted through an antenna 485.

As noted above, in one embodiment the erasure bit computation block 415 is configured to compute the erasure bits based on the jammed sub-carrier position information that may have been received from the receiver device 200, which may perform interference detection and feed back to the transmitter device 100 the list of positions of the jammed sub-carriers $\{P_n^{raw}, n=1, 2, \ldots, N_{in}^{raw}\}$. The list of the jammed sub-carriers $\{P_n^{raw}, n=1, 2, \ldots, N_{in}^{raw}\}$ can be defined as the "raw null tone list," with $P_n^{raw}$ being the "raw" tone index on the spectrum. For ECMA-368/369 UWB, $P_n^{raw}$ ranges between (−64) and (63), for a total of 128 sub-carriers, any number of which (including 0) may be jammed. Here, we are dealing with the jammed sub-carriers on data tones, as distinguished from pilot tones, guard tones, and null tones inserted by the block 435.

Figure 5:
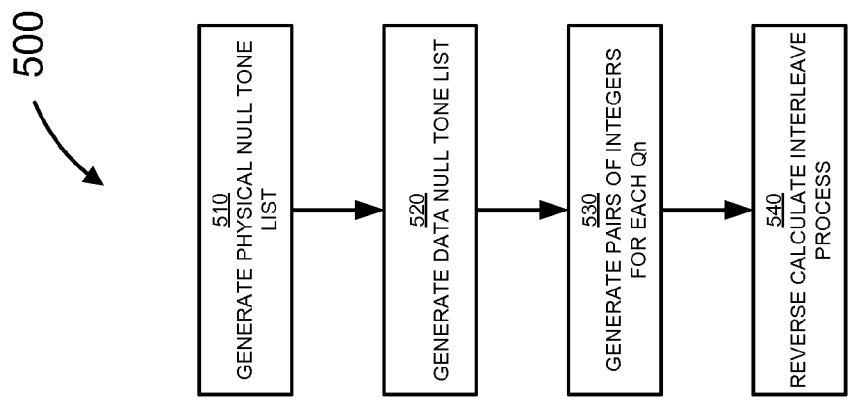
FIG. 5 illustrates selected steps of a method of erasure mask calculation.

After obtaining the jammed sub-carriers positions, the erasure bit computation block 415 calculates the "erasure mask," which is the list of the indices to which erasure bits will be inserted by the insert erasure bit block 410. Selected steps of a procedure 500 for erasure mask calculation are shown in FIG. 5.

In step 510, a complete physical null tone list $\{P_n, n=1, 2, \ldots, N_{in}\}$ is generated.

In one embodiment for 53.3 Mbps and 80 Mbps data rates operation, the complete physical null tone list may be the same as the raw null tone list. That is, $$\{P_n, n=1, 2, \ldots, N_{in}\} = \{P_1^{raw}, P_2^{raw}, \ldots, P_{N_{in}^{raw}}^{raw}\},$$

$$N_{in} = N_{in}^{raw}$$

In one embodiment for 106.7 Mbps, 160 Mbps, and 200 Mbps data rates operation, the complete null tone list may contain both the raw null tone list and the symmetric (mirrored) tone positions on the spectrum. That is, $$\{P_n, n=1, 2, \ldots, N_{in}\} = \{P_1^{raw}, P_2^{raw}, \ldots, P_{N_{in}^{raw}}^{raw}, -P_1^{raw}, -P_2^{raw}, \ldots, P_{N_{in}^{raw}}^{raw}\}$$

where $$N_{in} = 2N_{in}^{raw}$$

Thus, in one embodiment. the complete physical null tone list has a length $$N_{in} = \frac{2}{N_{FDS}} \cdot N_{in}^{raw},$$

where $N_{FDS}$ is the frequency domain spreading factor (defined in ECMA-368).

In an embodiment for 320 Mbps, 400 Mbps, and 480 Mbps data rates operation, the complete null tone list may contain both the raw null tone list and the DCM paired tone positions on the spectrum. That is, $$\{P_n, n=1, 2, \ldots, N_{in}\} = \{P_1^{raw}, P_2^{raw}, \ldots, P_{N_{in}^{raw}}^{raw}, P_1^{raw}+K_1, P_2^{raw}+K_2, \ldots, P_{N_{in}^{raw}}^{raw}+K_{N_{in}^{raw}}\}$$

where $$K_i = \begin{cases} 64, & P_i^{raw} < 0 \\ -64, & P_i^{raw} \geq 0 \end{cases}$$

$$N_{in} = 2N_{in}^{raw}$$

In step 520, a data null tone list $\{Q_n, n=1, 2, \ldots, N_{in}\}$ is generated. This can be done, for example, by converting each $P_n$ to $Q_n$ using the tone mapping rule defined by the ECMA-368 standard. Note that for 53.3 Mbps and 80 Mbps data rates operation, the entries in the data tone list are such that $0 \leq Q_n \leq 49$; and for the rest of the data rates, the entries in data tone list are such that $0 \leq Q_n \leq 99$.

In step 530, for each $$Q_n, \left(\frac{6}{N_{TDS}}\right)$$

pairs of integers are generated, as follows:

$$\{2Q_n, 2Q_n+1\} + k \cdot N_{CBPS}, k=0, 1, \ldots, (6/N_{TDS}-1).$$

Here, $N_{CBPS}$ is the number of coded bits per OFDM symbol, and $N_{TDS}$ is the time domain spreading factor; these parameters are defined in the ECMA-368 for different PHY data rates.

The integers are stacked into a list $\{q_n\}$. The length of this list is $$N_{erasure} = N_{in} \cdot \frac{6}{N_{TDS}} \cdot 2 = \left(\frac{2}{N_{FDS}} \cdot N_{in}^{raw}\right) \cdot \frac{6}{N_{TDS}} \cdot 2.$$

In step 540, for each $q_n$ in the generated list, the erasure bit computation block 415 reverse-calculates the three-step interleave process. This may be done as follows.

The corresponding index before cyclic shifter is $$q_n^{(1)} = \left\lfloor \frac{q_n}{N_{CBPS}} \right\rfloor \times N_{CBPS} + \text{mod}\left(q_n + \left\lfloor \frac{q_n}{N_{CBPS}} \right\rfloor \times N_{CYC}, N_{CBPS}\right),$$

where $N_{CYC}$ is an interleaver related parameter defined in the ECMA-368 standard.

The corresponding index before tone interleaver is $$q_n^{(2)} = \left\lfloor \frac{q_n^{(1)}}{N_{Tint}} \right\rfloor + 10 \times \text{mod}(q_n^{(1)}, N_{Tint}),$$

where $N_{Tint}$ is another interleaver related parameter defined by the ECMA-368 standard.

The corresponding index before symbol interleaver is $$q_n^{(3)} = \left\lfloor \frac{q_n^{(2)}}{N_{CBPS}} \right\rfloor + \left(\frac{6}{N_{TDS}}\right) \times \text{mod}(q_n^{(2)}, N_{CBPS}).$$

Stacking all the $q_n^{(3)}$ thus obtained into a list $\{q_n^{(3)}\}$ results in the erasure mask, which is a set of $N_{erasure}$ integers, with each integer indicating an index where an erasure bit will be inserted.

The insert erasure bit block 410 is configured to receive the erasure mask (or equivalent information) calculated by the erasure bit computation block 415, and insert the erasure bits into the convolutionally encoded data in accordance with this mask so that the insert erasure bit block 410 outputs into the interleaver 420 fixed size sub-blocks, as is discussed above in relation to FIG. 3. In performing this operation, the insert erasure bit block 410 reads every block of $N'_{NCBP6S} = N_{NCBP6S} - N_{erasure}$ consecutive coded bits and inserts a number of $N_{erasure}$ erasure bits of predetermined value (0 or 1) or even random value into the positions specified by the erasure mask $\{q_n^{(3)}\}$. Thus, after erasure bits insertion, the size of each block (including both coded bits and erasure bits) is $N_{NCBP6S}$, as specified in the ECMA-368 standard.

After inserting erasure bits, the blocks of $N_{NCBP6S}$ bits (with both coded bits and erasure bits) go through an interleaving process, which may be a three-step interleaving process. Then, the interleaved bits are modulated into QPSK symbols and loaded onto sub-carriers according to the ECMA-368 tone mapping rule. As expected, the modulated symbols from erasure bits will be loaded on exactly those sub-carriers in the complete physical null tone list $\{P_n, n=1, 2, \ldots, N_{in}\}$. Then, the transmit tone null tone inserter block 445 resets the values of the modulated symbols on these sub-carriers to zero or another predetermined value. After that, the rest of the transmitter chain may be the same as specified in the ECMA-368 standard.

Figure 6:
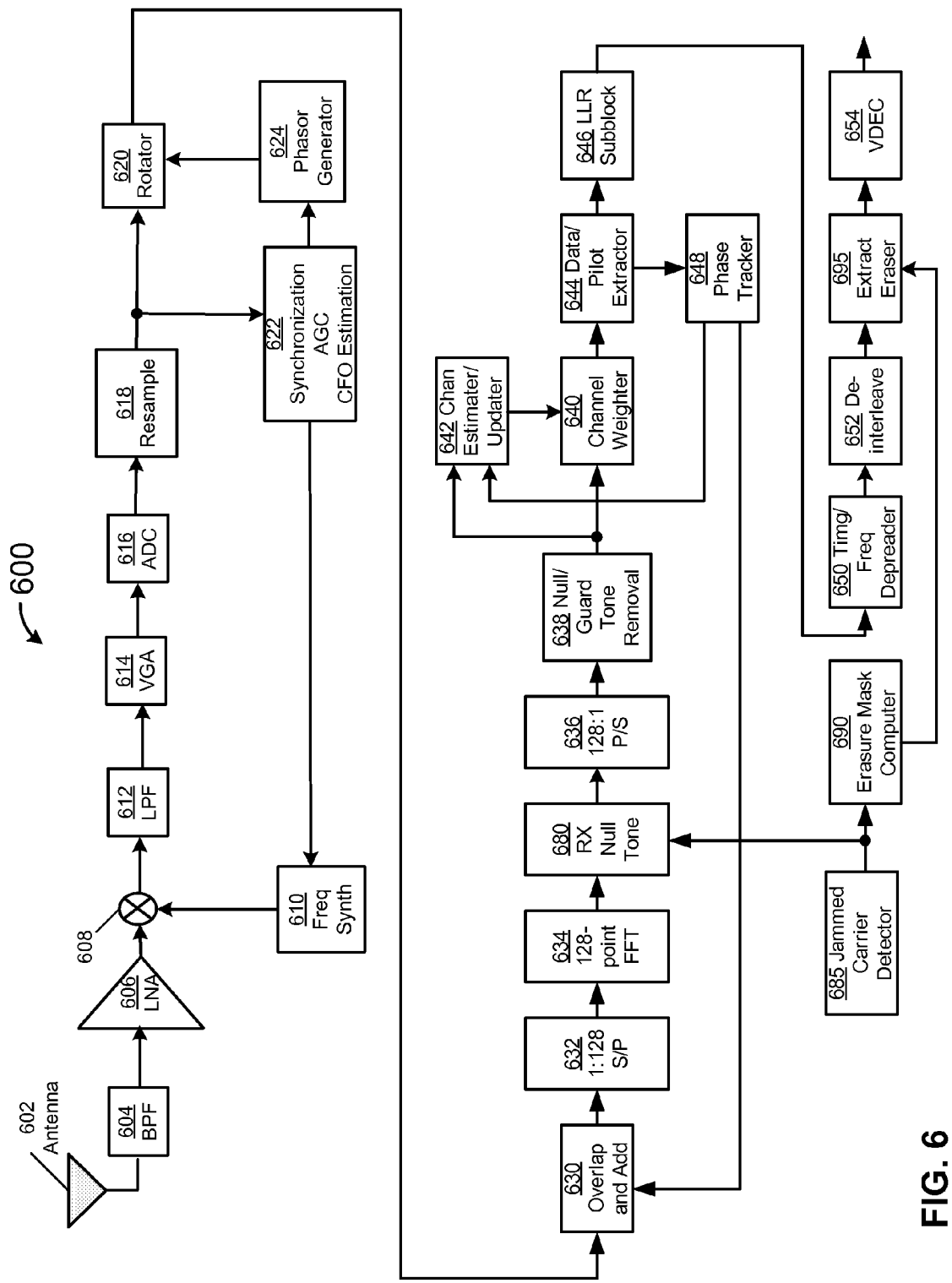
FIG. 6 illustrates in a block diagram form selected components of a receiver configured to implement the adaptive erasure technique.

FIG. 6 illustrates in a block diagram form selected components of an ECMA-368/369 UWB receiver 600 configured to implement the adaptive erasure technique. The receiver 600 may be the same as the receiver 248 of the receiver device 200, and be configured to communicate with the transmitting device 100.

In the exemplary embodiment, the front end of the receiver 600 includes the following components, configured as is shown in the upper part of FIG. 6: an antenna 602, a bandpass filter (BPF) 604, a low noise amplifier (LNA) 606, a down-converting mixer 608, a frequency synthesizer 610, a post mixer lowpass filter (LPF) 612, a variable gain amplifier (VGA) 614, an analog-to-digital converter (ADC) 616, a resample circuit 618, a rotator 620, a synchronization, automatic gain control (AGC), and carrier frequency offset (CFO) determining circuit 622, and a phasor generator 624.

The components of the receiver 600 that may follow the front end include an overlap and add block 630, a serial-to-parallel converter 632, a fast fourier transform (FFT) block 634, a parallel-to-serial converter 636, a null/guard tone removal block 638, a channel estimater/updater 642, a channel weighter 640, a data/pilot extractor 644, a log likelihood ratio (LLR) block 646, a phase tracker 648, a despreader 650, a deinterleaver 652, and a decoder 654 (e.g., a Viterbi decoder or VDEC).

Advantageously, the receiver 600 also includes a receiver null tone removal block 680, a jammed sub-carrier detector 685, an erasure mask computation block 690, and an erasure bit extractor 695. The receiver null tone removal block 680 is configured to read the jammed sub-carrier positions from the jammed sub-carrier detector 685, and to null out the corresponding received symbols on those jammed sub-carriers. The jammed sub-carrier detector 685 is configured to determine which of the OFDM sub-carriers received from the transmitter 400 are jammed and should not be used for transmissions from the transmitter device to the receiver device. The jammed sub-carrier position information determined by the detector 685 may also be transmitted to the transmitter device 100, so that it can be used in the erasure mask computation block 415 and the transmit null tone inserter block 445. As discussed below, the erasure bits will be extracted after the deinterleaver 652.

The receiver device 200 may also transmit the jammed sub-carrier position information determined by the detector 685 to the transmitter device 100, so that the information can be used in the erasure mask computation block 415 and the transmit null tone inserter block 445, enabling the transmitter device 100 to perform the appropriate transmit erasure operation. The jammed sub-carrier position information may include tone number and corresponding power.

If bi-directional communication is active between the two devices 100/200, then the transmitter device can at some point enter receive mode and enable the same jammer detection algorithm as the receiver device and detect the same jammed sub-carriers and insert the appropriate erasure bits. In addition, in some embodiments, that the two devices 100/200 are close to each other and experience substantially the same channel and interference conditions, in which case the transmitter device would detect the same impacted tones using the same detector algorithm as the detector 685 and insert the appropriate erasures.

The erasure mask computation block 690 is configured to compute the erasure bits based on the jammed sub-carrier position information. The erasure mask computational block 690 may be similar to, or the same as, the erasure bit computational block 415 of the transmitter device 100, so that the receiver device 200 has a local copy of the erasure mask $\{q_n^{(3)}\}$ that is used in the transmitter device 100. In some variants, only one of the devices 100 and 200 implements an erasure mask computation block; the device that implements such block is then configured to communicate the erasure mask to the other device.

After the deinterleaver 652, the erasure bit extractor 695 is configured to read in every $N_{NCBP6S}$ consecutive soft bit metrics (LLRs). Then, the erasure bit extractor 695 writes out $N'_{NCBP6S}=N_{NCBP6S}-N_{erasure}$ of these LLRs into the decoder 654, by skipping a total of $N_{erasure}$ LLRs on the position(s) as specified in the erasure mask. After this extraction, the LLRs may be input to the decoder 654 to decode the information (non-erasure) bits.

The erasure bit extractor 695 extracts the erasure bits inserted into the data by the insert erasure bit block 410 of the transmitter. The erasure bit extractor 695 is positioned after the deinterleaver 652, essentially reversing the function of the insert erasure bit block 410.

The receiver device 200 and the transmitter device 100 may synchronize updating of the jammed sub-carrier position information (or of information derived from the jammed sub-carrier position information) used in the blocks 410, 415, 445, 680, 690, and 695. For example, a message from the receiver device 200 to the transmitter device 100 may include time (e.g., a frame reference number) for initiating the use of the updated jammed sub-carrier information for transmissions from the device 100 to the device 200. This may be done, for example, periodically with a predetermined time interval (so many microseconds or frames), or based on dynamically varying interference. In the latter case, the jammed sub-carrier detector (whether at the transmitter device or the receiver device) may determine when the latest real-time jammed sub-carrier information differs sufficiently from the jammed sub-carrier information currently used by the two devices to justify initiating transition to transmissions using the latest information. In some variants, a change in even a single tone can justify the transition.

The jammed sub-carrier position information may be communicated between the first device 100 and the second device 200 (in either direction, as needed or desired) in the MAC headers under a modified ECMA-368/369 transmission protocol. For example, the information may be conveyed in enhanced MAC header of Data frames, Zero-length Data frames, or Command frames. The time reference may also be transmitted in vendor-specific Command Frame payloads, or vendor-specific Control Frame payloads, which are allowed under the current version of the ECMA-368 standard.

The jammed sub-carrier information may also be communicated from the first device 100 to the second device 200 and in the opposite direction using information elements in beacon frames.

The jammed sub-carrier information may be obtained by one of the devices 100 or 200 by querying/probing the other device 200 or 100. For example, the first device 100 may send a jammed sub-carrier information query to the second device 200, and then receive the jammed sub-carrier information from the second device 200 in response to the query; similarly, the second device 200 may send a jammed sub-carrier information query to the first device 100 and receive the jammed sub-carrier information from the first device 100 in response to the query.

Figure 7:
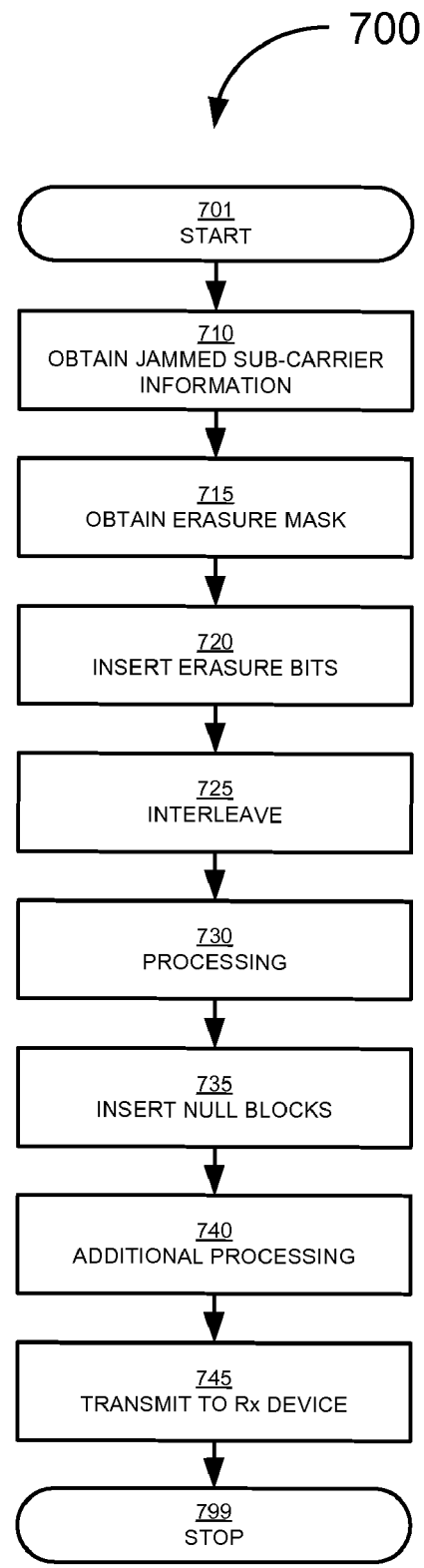
FIG. 7 illustrates selected steps of a transmitter device process for interference-adaptive communications.

FIG. 7 illustrates a process 700 for interference-adaptive communications performed at a transmitter device. At block 701, flow begins when the transmitter device (e.g., the device 100) is within communication range of a receiver device (e.g., the device 200). In one embodiment, the communications may use OFDM techniques.

At block 710, the transmitter device obtains jammed sub-carrier information. For example, the transmitter device obtains this information from the receiver device, or detects the jammed sub-carriers using a local detector; the information may be based on detection of jamming of the sub-carriers transmitted from the transmitter device to the receiver device, or based on detection of jamming if sub-carriers transmitted in the opposite direction.

At block 715, the transmitter device obtains an erasure mask. For example, the transmitter device obtains this information from the receiver device, or computes the mask locally from the jammed sub-carrier information.

At block 720, the transmitter device inserts erasure bits into a data stream to be transmitted to the receiver device. This step is performed in accordance with the erasure mask so as to obtain constant size interleaver sub-blocks, and so that the erasure bits fall on the jammed sub-carriers.

At block 725, the transmitter device interleaves the data stream with the inserted erasure bits using constant size interleaver sub-blocks.

At block 730, the transmitter device performs various processing operations on the interleaved sub-blocks. This may involve, for example, mapping the bits of the sub-blocks into modulated symbols, frequency spreading, and inserting pilot, guard, and null tones.

At block 735, the transmitter device inserts into the processed sub-blocks null blocks corresponding to the jammed sub-carriers.

At block 740, the transmitter device performs further processing on the signals obtained in block 735, such as time spreading, digital-to-analog conversion, filtering, and mixing.

At block 745, the transmitter device transmits the signal from block 740 to the receiver device.

The process may then terminate at block 799. It should be noted that in practical operation, the process is likely to continue as additional data is received or generated at the transmitter device for transmission to the receiver device.

Figure 8:
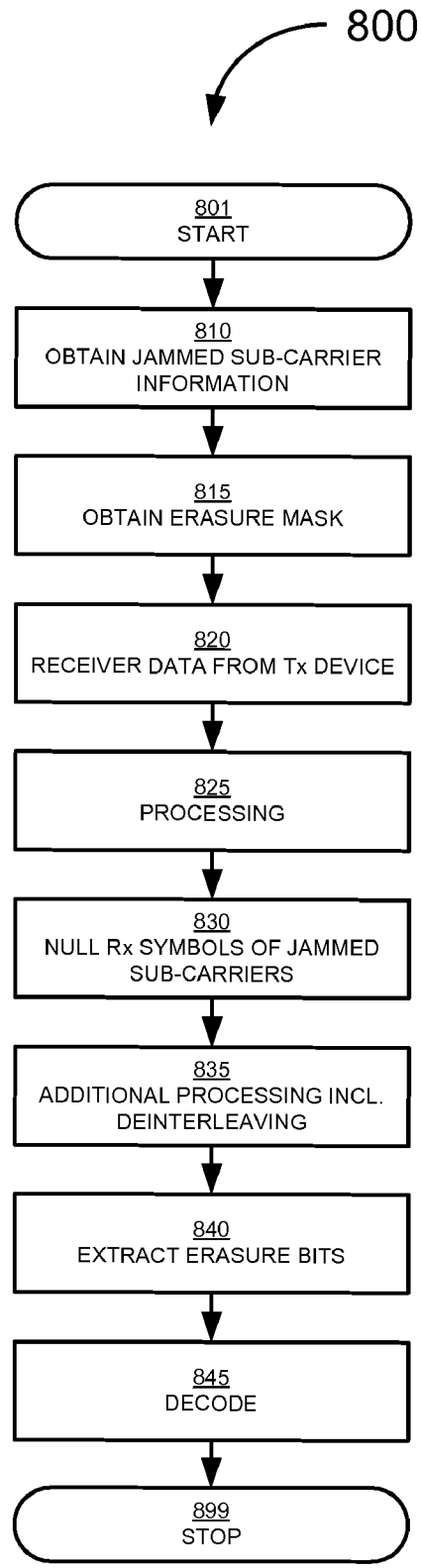
FIG. 8 illustrates selected steps of a receiver device process for interference-adaptive communications.

FIG. 8 illustrates a process 800 for interference-adaptive communications performed at a receiver device. At block 801, flow begins when a transmitter device (e.g., the device 100) is within communication range of a receiver device (e.g., the device 200). In one embodiment, the communications may use OFDM techniques.

At block 810, the receiver device obtains jammed sub-carrier information. For example, the receiver device obtains this information from the transmitter device, or detects the jammed sub-carriers from a local detector within the receiver device; the information may be based on detection of jamming of the sub-carriers transmitted from the transmitter device to the receiver device, or based detection of jamming of sub-carriers transmitted in the opposite direction.

At block 815, the receiver device obtains an erasure mask. For example, the receiver device obtains the mask from the transmitter device, or computes the mask locally.

At block 820, the receiver device receives interleaved sub-blocks of data from the transmitter device. In the received sub-blocks, erasure bits were inserted in accordance with the erasure mask so as to obtain constant size interleaver sub-blocks, with the erasure bits corresponding to the jammed sub-carrier positions.

At block 825, the receiver device processes the received interleaved sub-blocks. This may include demodulating, performing overlapping and adding functions, serial-to-parallel transformation, and fast fourier transformation.

At block 830, the receiver device reads the jammed sub-carriers positions, and nulls out the corresponding received symbols on those jammed sub-carriers.

At block 835, the receiver device further processes the data from block 830, for example, by removing null and guard tones, channel estimating, channel updating, channel weighting, extracting pilot/data, computing LLR, dispreading, and deinterleaving.

At block 840, the receiver device extracts the erasure bits from the deinterleaved data. These are the bits inserted into the data at the transmitter device to maintain constant interleaver size. The bits correspond to the symbols nulled out in block 830.

At block 845, after the erasure bits have been extracted, the receiver device decodes the data.

The process may then terminate at block 899. It should be noted that in practical operation, the process is likely to continue as additional data is received at the receiver device from the transmitter device.

Advantageously, the ability of inserting variable number of erasure bits can be used to control link data rate and achieve finer granularity in link rates. For example, the lowest data rate in ECMA-368 is limited to 53.3 Mbps. If the link is unable to support this lowest rate, the rate can be effectively lowered below this rate by inserting the appropriate number of erasures.

It is also advantageous that inserting erasure bits can provide a benefit to other devices. For example, if an "offending" device is operating in a selected portion of spectrum it may cause the selected portion of the spectrum to be jammed. A transmitted device, using techniques described, can insert erasure bits and create a "notch" in the spectrum of the transmitter where the offending device is operating. In this way, the offending device benefits because the selected portion of the spectrum is free from interference from the transmitting device. Also, other devices benefit because the overall amount of interference in the spectrum may be reduced.

Another benefit of inserting erasure bits can be reducing the power consumption of a transmitting device. For example, if a transmitting device is power spectral density limited, then inserting erasure bits can decrease the overall transmit power level of the transmitting device. The decrease in transmit power can reduce the overall power consumption of the transmitting device.

Although steps and decision blocks of various methods may have been described serially in this disclosure, some of these steps and decisions may be performed by separate elements in conjunction or in parallel, asynchronously or synchronously, in a pipelined manner, or otherwise. There is no particular requirement that the steps and decisions be performed in the same order in which this description lists them, except where explicitly so indicated, otherwise made clear from the context, or inherently required. It should be noted, however, that in selected variants the steps and decisions are performed in the particular sequences described above and/or shown in the accompanying Figures. Furthermore, not every illustrated step and decision may be required in every system in accordance with the invention, while some steps and decisions that have not been specifically illustrated may be desirable or necessary in some systems in accordance with the invention.

Those skilled in the art would understand that the concepts described in this document are applicable to various networks, including wireless local area networks, and wireless personal area networks.

Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To show clearly this interchangeability of hardware and software, various illustrative components, blocks, modules, circuits, and steps may have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments. Thus, the present invention is not intended to be limited to the embodiments shown herein, but is to be accorded the widest scope consistent with the principles and novel features disclosed herein.

What is claimed is:

1. A communication method comprising:
    obtaining at a transmitter device current jammed sub-carrier information identifying currently jammed sub-carriers of a plurality of sub-carriers for carrying data from the transmitter device to a receiver device;
    obtaining at the transmitter device an erasure mask corresponding to the current jammed sub-carrier information;
    inserting erasure bits into each of a plurality of data sub-blocks processed at least partially in accordance with the erasure mask to obtain sub-blocks of a predetermined size;
    interleaving each sub-block of the sub-blocks of the predetermined size to obtain interleaved sub-blocks, the erasure bits being located in the sub-blocks of a predetermined size so that the erasure bits occupy the currently jammed sub-carriers; and
    transmitting wirelessly the interleaved sub-blocks from the transmitter device.

2. The method of claim 1, further comprising:
    nulling out the currently jammed sub-carriers before transmitting.

3. The method of claim 1, wherein obtaining current jammed sub-carrier information comprises receiving the information from the receiver device.

4. The method of claim 3, wherein obtaining current jammed sub-carrier information is performed periodically with a predetermined time interval.

5. The method of claim 3, wherein obtaining current jammed sub-carrier information is performed at times determined by dynamically varying interference affecting communications between the transmitter device and the receiver device.

6. The method of claim 3, wherein obtaining current jammed sub-carrier information comprises receiving at the transmitter device one or more predetermined messages comprising the information.

7. The method of claim 1, wherein obtaining current jammed sub-carrier information comprises determining the information locally at the transmitter device.

8. The method of claim 1, wherein obtaining current jammed sub-carrier information comprises:
    sending a jammed sub-carrier query to the receiver device; and
    in response to the jammed sub-carrier query, receiving from the receiver device the jammed sub-carrier information.

9. The method of claim 1, further comprising:
    mapping bits of the interleaved sub-blocks into modulated symbols, the step of mapping being performed before the step of transmitting.

10. The method of claim 1, wherein:
    transmitting is performed in accordance with ECMA-368 standard and the sub-carriers of the plurality of sub-carriers are orthogonal frequency division multiplexed (OFDM) sub-carriers.

11. The method of claim 10, wherein:
    obtaining the erasure mask comprises obtaining the erasure mask so that the erasure bits occupy the currently jammed sub-carriers.

12. The method of claim 10, wherein obtaining the erasure mask comprises:
    generating a complete physical null tone list $\{P_n, n=1, 2, \ldots, N_{in}\}$;
    generating a data null tone list $\{Q_n, n=1, 2, \ldots, N_{in}\}$ by converting each $P_n$ to $Q_n$ using tone mapping rule defined by the ECMA-368 standard;
    for each $Q_n$, generating $$\left(\frac{6}{N_{TDS}}\right)$$

pairs of integers according to rule:

$\{2Q_n, 2Q_n+1\} + k \cdot N_{CBPS}$, $k=0, 1, \ldots, (6/N_{TDS}-1)$;

stacking the integers into a list $\{q_n\}$;
    for each entry in the list $\{q_n\}$, reverse-calculating the step of interleaving to obtain integers $q_n^{(3)}$; and
    stacking the integers $q_n^{(3)}$ into a list $\{q_n^{(3)}\}$ to obtain the erasure mask, wherein the integers $q_{n(3)}$ indicate indices for inserting the erasure bits.

13. A communications device comprising:
    a memory;
    a wireless receiver;
    a wireless transmitter; and
    a controller coupled to the wireless receiver, the wireless transmitter, and the memory, the controller being configured to:
        obtain at the transmitter device current jammed sub-carrier information identifying currently jammed sub-carriers of a plurality of sub-carriers for carrying data from the transmitter device to a receiver device,
        obtain at the transmitter device an erasure mask corresponding to the current jammed sub-carrier information, insert erasure bits into each of a plurality of sub-blocks processed in accordance with the erasure mask to obtain sub-blocks of a predetermined size, interleave each sub-block of the sub-blocks of the predetermined size to obtain interleaved sub-blocks, the erasure bits being located in the sub-blocks of a predetermined size so that the erasure bits occupy the currently jammed sub-carriers, and communicate the interleaved sub-blocks to the wireless transmitter for transmission.

14. The communications device of claim 13, wherein further comprise:
nulling out the currently jammed sub-carriers before the step of transmitting.

15. The communications device of claim 13, wherein obtaining current jammed sub-carrier information comprises receiving the information from the receiver device.

16. The communications device of claim 15, wherein obtaining current jammed sub-carrier information periodically with a predetermined time interval.

17. The communications device of claim 15, wherein obtaining current jammed sub-carrier information at times determined by dynamically varying interference affecting communications between the transmitter device and the receiver device.

18. The communications device of claim 15, wherein obtaining current jammed sub-carrier information comprises receiving at the transmitter device one or more vendor-specific messages comprising the information.

19. The communications device of claim 13, wherein obtaining current jammed sub-carrier information comprises determining the information locally at the transmitter device.

20. The communications device of claim 13, further comprising:
mapping bits of the interleaved sub-blocks into modulated symbols, mapping being performed before transmitting.

21. The communications device of claim 13, wherein:
the wireless transmitter is configured to transmit in accordance with ECMA-368 standard;
the wireless receiver is configured to receive in accordance with the ECMA-368 standard; and
the transmitting is performed in accordance with the ECMA-368 standard and the sub-carriers of the plurality of sub-carriers are orthogonal frequency division multiplexed (OFDM) sub-carriers.

22. The communications device of claim 21, wherein:
obtaining the erasure mask comprises computing the erasure mask so that the erasure bits occupy the currently jammed sub-carriers.

23. The communications device of claim 21, wherein obtaining the erasure mask comprises:
generating a complete physical null tone list $\{P^n, n=1, 2, \ldots, N_{in}\}$;
generating a data null tone list $\{Q_n, n=1, 2, \ldots, N_{in}\}$ by converting each $P_n$ to $Q_n$ using tone mapping rule defined by the ECMA-368 standard;
for each $Q_n$, generating $$\left(\frac{6}{N_{TDS}}\right)$$

pairs of integers according to rule:

$$\{2Q_n, 2Q_n+1\}+k \cdot N_{CBPS}, k=0, 1, \ldots, (6/N_{TDS}-1);$$

stacking the integers into a list $\{q_n\}$;

for each entry in the list $\{q_n\}$, reverse-calculating the step of interleaving to obtain integers $q_n^{(3)}$; and
stacking the integers $q_n^{(3)}$ into a list $\{q_n^{(3)}\}$ to obtain the erasure mask, wherein the integers $q_n^{(3)}$ indicate indices for inserting the erasure bits.

24. A communications device comprising:
a means for storing data;
a means for wirelessly receiving;
a means for wirelessly transmitting; and
a means for processing coupled to the means for receiving, the means for transmitting, and the means for storing, the means for processing being configured to:
obtain at the transmitter device current jammed sub-carrier information identifying currently jammed sub-carriers of a plurality of sub-carriers for carrying data from the transmitter device to a receiver device,
obtain at the transmitter device an erasure mask corresponding to the current jammed sub-carrier information,
insert erasure bits into each sub-block processed in accordance with the erasure mask to obtain sub-blocks of a predetermined size,
interleave each sub-block of the sub-blocks of the predetermined size to obtain interleaved sub-blocks, the erasure bits being located in the sub-blocks of predetermined size so that the erasure bits occupy the currently jammed sub-carriers, and
communicate the interleaved sub-blocks to the wireless transmitter for transmission.

25. A computer program product comprising:
non-transitory computer-readable medium comprising:
code for causing a computer to obtain at the transmitter device current jammed sub-carrier information identifying currently jammed sub-carriers of a plurality of sub-carriers for carrying data from the transmitter device to a receiver device;
code for causing a computer to obtain at the transmitter device an erasure mask corresponding to the current jammed sub-carrier information;
code for causing a computer to insert erasure bits into each sub-block processed in accordance with the erasure mask to obtain sub-blocks of a predetermined size;
code for causing a computer to interleave each sub-block of the sub-blocks of the predetermined size to obtain interleaved sub-blocks, the erasure bits located in the sub-blocks of predetermined size so that the erasure bits occupy the currently jammed sub-carriers; and
code for causing a computer to communicate the interleaved sub-blocks to a transmitter for transmission from the transmitter device.

26. A communication method comprising:
obtaining at a receiver device current jammed sub-carrier information identifying currently jammed sub-carriers of a plurality of sub-carriers for carrying data from a transmitter device to the receiver device;
obtaining at the receiver device an erasure mask corresponding to the current jammed sub-carrier information;
receiving at the receiver device interleaved sub-blocks from the transmitter device, the interleaved sub-blocks having a predetermined size, the interleaved sub-blocks comprising erasure bits inserted in accordance with the erasure mask;
deinterleaving each interleaved sub-block of the interleaved sub-blocks to obtain deinterleaved sub-blocks;
removing the erasure bits from the deinterleaved sub-blocks in accordance with the erasure mask to obtain processed sub-blocks wherein the erasure bits are located in the sub-blocks so that the erasure bits occupy the currently jammed sub-carriers; and decoding the processed sub-blocks.

27. The method of claim 26, further comprising:
nulling out the currently jammed sub-carriers before deinterleaving.

28. The method of claim 26, wherein obtaining current jammed sub-carrier information comprises receiving the information from the transmitter device.

29. The method of claim 28, wherein obtaining current jammed sub-carrier information is performed periodically with a predetermined time interval.

30. The method of claim 28, wherein obtaining current jammed sub-carrier information is performed at times determined by dynamically varying interference affecting communications between the transmitter device and the receiver device.

31. The method of claim 28, wherein obtaining current jammed sub-carrier information comprises receiving at the receiver device one or more pre-determined messages comprising the information.

32. The method of claim 26, wherein obtaining current jammed sub-carrier information comprises determining the information locally at the receiver device.

33. The method of claim 26, further comprising:
demodulating the interleaved sub-blocks.

34. The method of claim 26, wherein:
receiving is performed in accordance with ECMA-368 standard and the sub-carriers of the plurality of sub-carriers are orthogonal frequency division multiplexed (OFDM) sub-carriers.

35. The method of claim 34, wherein:
obtaining the erasure mask comprises obtaining the erasure mask so that the erasure bits occupy the currently jammed sub-carriers.

36. The method of claim 34, wherein obtaining the erasure mask comprises:
generating a complete physical null tone list $\{P^n, n=1, 2, \ldots, N_{in}\}$;
generating a data null tone list $\{Q_n, n=1, 2, \ldots, N_{in}\}$ by converting each $P_n$ to $Q_n$ using tone mapping rule defined by the ECMA-368 standard;
for each $Q_n$, generating $$\left(\frac{6}{N_{TDS}}\right)$$

pairs of integers according to rule:
$\{2Q_n, 2Q_n+1\}+k \cdot N_{CBPS}, k=0, 1, \ldots, (6/N_{TDS}-1)$;
stacking the integers into a list $\{q_n\}$;
for each entry in the list $\{q_n\}$, reverse-calculating the step of interleaving to obtain integers $q_n^{(3)}$; and
stacking the integers $q_n^{(3)}$ into a list $\{q_n^{(3)}\}$ to obtain the erasure mask, wherein the integers $q_n^{(3)}$ indicate indices for inserting the erasure bits.

37. The method of claim 26, further comprising:
transmitting the current jammed sub-carrier information from the receiver device to the transmitter device.

38. The method of claim 26, further comprising:
transmitting the erasure mask from the receiver device to the transmitter device.

39. A communications device comprising:
a memory;
a wireless receiver;
a wireless transmitter; and
a controller coupled to the wireless receiver, the wireless transmitter, and the memory, the controller configured to:
obtain current jammed sub-carrier information identifying currently jammed sub-carriers of a plurality of sub-carriers for carrying data from a transmitter device to the communications device,
obtain an erasure mask corresponding to the current jammed sub-carrier information,
receive interleaved sub-blocks from the transmitter device, the interleaved sub-blocks having a predetermined size, the interleaved sub-blocks comprising erasure bits inserted in accordance with the erasure mask,
deinterleave each interleaved sub-block of the interleaved sub-blocks to obtain deinterleaved sub-blocks,
remove the erasure bits from the deinterleaved sub-blocks in accordance with the erasure mask to obtain processed sub-blocks wherein the erasure bits are located in the sub-blocks so that the erasure bits occupy the currently jammed sub-carriers, and
decode the processed sub-blocks.

40. The communications device of claim 39, wherein the controller is further configured to null out the currently jammed sub-carriers before deinterleaving.

41. The communications device of claim 39, wherein obtaining current jammed sub-carrier information comprises receiving the information from the transmitter device.

42. The communications device of claim 41, wherein obtaining current jammed sub-carrier information is performed periodically with a predetermined time interval.

43. The communications device of claim 41, wherein obtaining current jammed sub-carrier information is performed at times determined by dynamically varying interference affecting communications between the transmitter device and the communications device.

44. The communications device of claim 41, wherein obtaining current jammed sub-carrier information comprises receiving at the communications device one or more vendor-specific messages comprising the information.

45. The communications device of claim 39, wherein obtaining current jammed sub-carrier information comprises determining the information locally at the communications device.

46. The communications device of claim 39, further comprising:
a demodulator configured to demodulate the interleaved sub-blocks.

47. The communications device of claim 39, wherein:
the wireless receiver is configured to communicate in accordance with the ECMA-368 standard;
the wireless transmitter is configured to communicate in accordance with ECMA-368 standard; and
receiving is performed in accordance with the ECMA-368 standard and the sub-carriers of the plurality of sub-carriers are orthogonal frequency division multiplexed (OFDM) subcarriers.

48. The communications device of claim 47, wherein:
obtaining the erasure mask comprises step for computing the erasure mask so that the erasure bits occupy the currently jammed sub-carriers.

49. The communications device of claim 47, wherein obtaining the erasure mask comprises:
generating a complete physical null tone list $\{P_n, n=1, 2, \ldots, N_{in}\}$;

generating a data null tone list $\{Q_n, n=1, 2, \ldots, N_{tn}\}$ by converting each $P_n$ to $Q_n$ using tone mapping rule defined by the ECMA-368 standard;

for each $Q_n$, generating $$\left(\frac{6}{N_{TDS}}\right)$$

pairs of integers according to rule:

$$\{2Q_n, 2Q_n+1\}+k\cdot N_{CBPS}, k=0, 1, \ldots, (6/N_{TDS}-1);$$

stacking the integers into a list $\{q_n\}$;

for each entry in the list $\{q_n\}$, reverse-calculating the step of interleaving to obtain integers $q_n^{(3)}$; and stacking the integers $q_n^{(3)}$ into a list $\{q_n^{(3)}\}$ to obtain the erasure mask, wherein the integers $q_n^{(3)}$ indicate indices for inserting the erasure bits.

50. The communications device of claim 39, further comprising:
the controller communicating the current jammed sub-carrier information to the wireless transmitter for transmission.

51. The communications device of claim 39, further comprising:
the controller communicating the erasure mask to the wireless transmitter for transmission.

52. A communications device comprising:
a means for storing data;
a means for wirelessly receiving;
a means for wirelessly transmitting; and
a means for processing coupled to the means for receiving, the means for transmitting, and the means for storing, the means for processing being configured to:
obtain current jammed sub-carrier information identifying currently jammed sub-carriers of a plurality of sub-carriers for carrying data from a transmitter device to the receiver device,
obtain an erasure mask corresponding to the current jammed sub-carrier information,
receive interleaved sub-blocks from the transmitter device, the interleaved sub-blocks having a predetermined size, the interleaved sub-blocks comprising erasure bits inserted in accordance with the erasure mask,
deinterleave each interleaved sub-block of the interleaved sub-blocks to obtain deinterleaved sub-blocks,
remove the erasure bits from the deinterleaved sub-blocks in accordance with the erasure mask to obtain processed sub-blocks wherein the erasure bits are located in the sub-blocks so that the erasure bits occupy the currently jammed sub-carriers, and
decode the processed sub-blocks.

53. A computer program product comprising:
non-transitory computer-readable medium comprising:
code for causing a computer to obtain at the wireless receiver device current jammed sub-carrier information identifying currently jammed sub-carriers of a plurality of sub-carriers for carrying data from a wireless transmitter device to the wireless receiver device;
code for causing a computer to obtain at the wireless receiver device an erasure mask corresponding to the current jammed sub-carrier information;
code for causing a computer to receive at the wireless receiver device interleaved sub-blocks from the wireless transmitter device, the interleaved sub-blocks having a predetermined size, the interleaved sub-blocks comprising erasure bits inserted in accordance with the erasure mask;
code for causing a computer to deinterleave each interleaved sub-block of the interleaved sub-blocks to obtain deinterleaved sub-blocks;
code for causing a computer to remove the erasure bits from the deinterleaved sub-blocks in accordance with the erasure mask to obtain processed sub-blocks, the erasure bits being located in the sub-blocks so that the erasure bits occupy the currently jammed sub-carriers; and
code for causing a computer to decode the processed sub-blocks;
wherein the step of obtaining the erasure mask is performed so that the erasure bits occupy the currently jammed sub-carriers.

* * * * *